United States Patent [19]
Ko

[11] Patent Number: 5,871,032
[45] Date of Patent: Feb. 16, 1999

[54] DIVERTER VALVE ASSEMBLY FOR CONTROL OF MULTIPLE DISCHARGE IN A MIXING FAUCET

[75] Inventor: Hsi-Chia Ko, Changhua Hsien, Taiwan

[73] Assignee: Chung Cheng Faucet Co., Ltd., Changhua Hsien, Taiwan

[21] Appl. No.: 905,121

[22] Filed: Aug. 1, 1997

[51] Int. Cl.[6] .................................................. F16K 11/85
[52] U.S. Cl. .............. 137/625.47; 137/597; 137/625.16; 137/876; 251/297
[58] Field of Search ..................... 137/625.16, 625.14, 137/625.47, 597, 874, 876; 251/297

[56] References Cited

U.S. PATENT DOCUMENTS

| | | | |
|---|---|---|---|
| 4,441,524 | 4/1984 | Mese | 137/625.47 |
| 4,628,962 | 12/1986 | Pezzarossi | 137/625.47 |
| 5,617,815 | 4/1997 | Spies et al. | 137/625.47 |

*Primary Examiner*—Stephen M. Hepperle
*Attorney, Agent, or Firm*—Browdy and Neimark

[57] ABSTRACT

A mixing faucet equipped with a diverter valve assembly having a specially designed seal sleeve has multiple discharge outlets. A pipe combination set having a closed end in communication with a hot and cold water tube and provided with a number of outlet tubes is mounted to a faucet body. The seal sleeve having a number of tubular discharge protrusions in conformance to the outlet tubes of the pipe combination set is housed in the pipe combination set. A diverter valve having an opened end and a water outlet is engaged with the seat sleeve that are housed in the pipe combination set. The diverter valve is controllably rotated so as to make the water outlet selectively register with one of the tubular discharge protrusions of the seal sleeve for control of the discharge path of a faucet. Besides, the diverter valve is provided with a spring biased retaining pin that is selectively engaged with one of a number of positioning holes on a knob so as to make the operation of the knob quick and precise. The seal sleeve has a number of axial ribs and each tubular discharge protrusion has two concentric circular ribs and radial secondary ribs for protecting leakage from happening in the seal sleeve.

3 Claims, 4 Drawing Sheets

DIVERTER VALVE ASSEMBLY FOR CONTROL OF MULTIPLE DISCHARGE IN A MIXING FAUCET

BACKGROUND OF THE INVENTION

The present invention relates to a diverter valve assembly having multiple discharge outlets for use in a mixing faucet. A pipe combination set having a closed end in communication with a hot and cold water tube is provided with a number of outlet tubes is mounted to faucet body. A seal sleeve having a number of tubular discharge protrusion in conformance the outlet tubes of the pipe combination set is housed in the pipe combination set. A diverter valve having a opened end and a water outlet is engaged with the seal sleeve that are housed in the pipe combination set. The diverter valve is controllably rotated so as to make the water outlet selectively register with one of the tubular discharge protrusions of the seal sleeve for control of the discharge path of a faucet. Besides, the diverter valve is provided with a spring biased retaining pin that is selectively engaged with one of a number of positioning holes on a knob so as to make the operation of the knob quick and precise. The seal sleeve has a number of axial ribs and each tubular discharge protrusion has two concentric circular ribs and radial secondary ribs for protecting leakage from happening in the seal sleeve.

There are various faucets having differently designing diverter valves available on the markets that generally can only discharge mixed cold and hot water via two outlets in one aspect; and the sealing ribs defined in a seal sleeve housed in the faucet body are not properly designed, so, leakage can still take place when deformation of a seal sleeve resulting from frictional wearing on the diverter valve is made in another aspect.

SUMMARY OF THE INVENTION

Therefore, the primary object of the present invention is to provide a diverter valve assembly for a mixing faucet which can discharge water selectively from a plurality of outlet tubes communicating with a shower head, a faucet, a massage tub, a sink and the like by way of a seal sleeve having a multiple tubular discharge protrusions engaged with a corresponding pipe combination set having a closed end in communicating connection to a hot and cold tubes and having a number of water outlet tubes so as to effect the multiple discharge of water.

Another object of the present invention is to provide a diverter valve assembly for a mixing faucet which has a seal sleeve having a plurality of axial ribs and a plurality of tubular discharge protrusions each has two concentric circular ribs and a number of radial secondary ribs for better guard against leakage in operation when the diverter valve is rotated in operation.

One further object of the present invention is to provide a diverter valve assembly for a mixing faucet which has a knob equipped with a number of positioning holes thereon so that a spring biased retaining pin mounted onto a limiting block secured to the diverter valve can be in selective engagement with one of the positioning holes of the knob in operation, making the rotation of the knob quick and ready.

DETAILED DESCRIPTION OF THE PREFERRED EMBODIMENT

Figure 1:
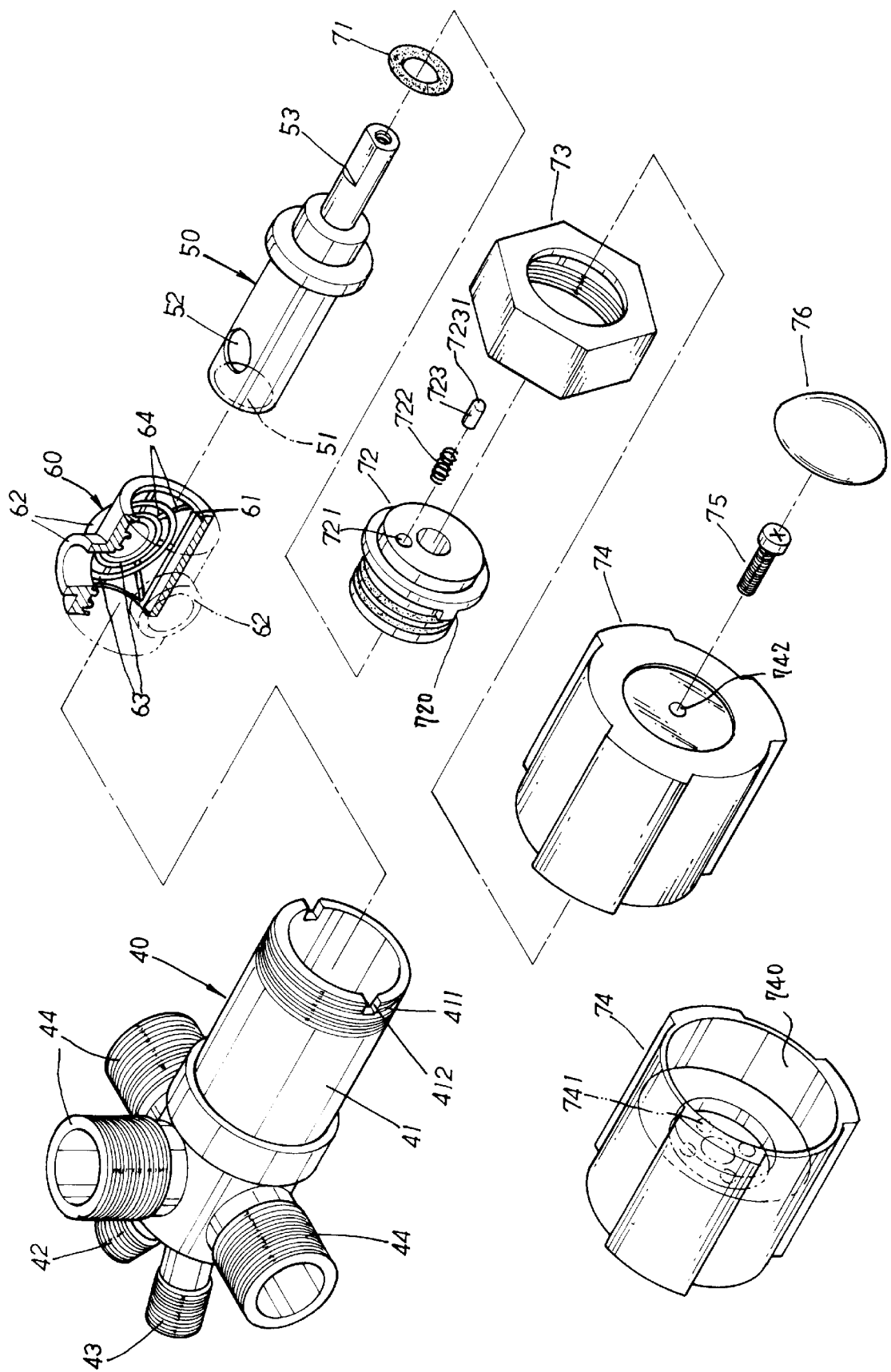
FIG. 1 is a diagram showing the exploded components of the present invention.

Referring to FIG. 1, the present invention mainly comprises a pipe combination set 40, a diverter valve 50, a seal sleeve 60, a seal washer 71, a limiting block 72, a locking rut 73, a knob 74, a screw 75 and a face lid 76. The pipe combination set 40 has a closed end communicating with a cold water tube 42 and a hot water tube 43 and 3 orthogonally disposed outlet tubes 44, one vertically extended and two horizontally alligned, are communicatingly connected to the closed end of the pipe combination set 40. At the other end of the pipe combination set 40 is provided with outer threads 411 and a pair of symmetric positioning recesses 412.

The diverter valve 50 has an opening 51 at the rear end and a water outlet 52 is defined adjacent the opening 51 on the tubular wall thereof. At the opposite end of the diverter valve 50 is provided with a rotatable shaft 53.

The seal sleeve 60 is of a tubular form divided internally into 4 equal portions by axial ribs 61. In each of the 3 portions is defined a tubular discharge protrusion 62. About each of the 3 tubular discharge protrusions 62, there are 2 circular ribs 63 disposed so as to effect a multiple sealing purpose. Inbetween the 2 circular ribs 63 and further between the outer one of the 2 circular ribs 63 and the axial ribs 61 are disposed radially extended secondary ribs 64.

At the front flat end of the limiting block 72 is disposed a receiving hole 721 for housing a spring 722 as well as a retaining pin 723 having a rounded end 7231. The knob 74 has an inner cavity 740 and 4 positioning holes 741 are defined on the end wall thereof.

Figure 2:
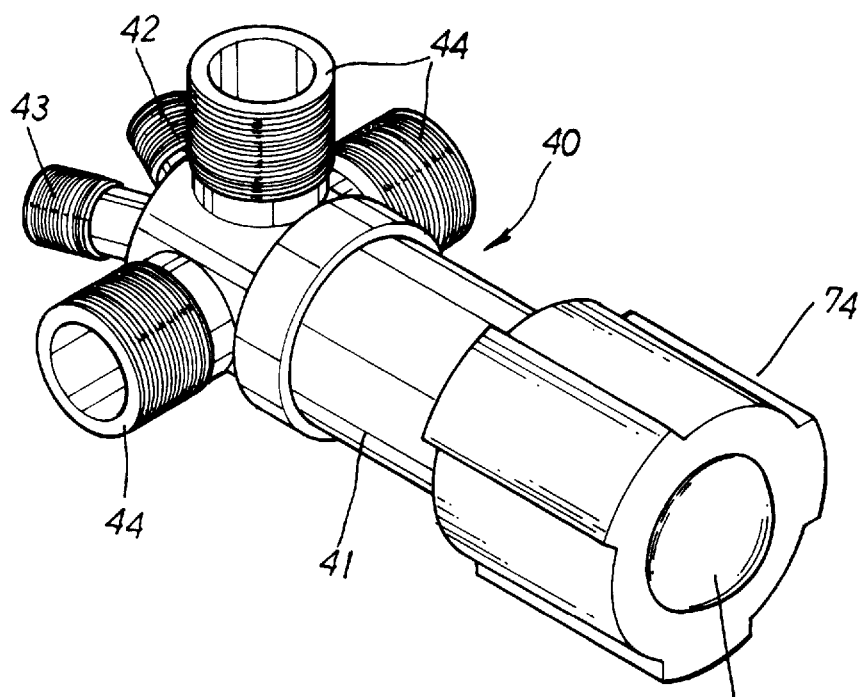
FIG. 2 is a diagram showing the assembly of the present invention.

As shown in FIG. 2, the assembly of the present invention is illustrated. In assembling, the seal sleeve 60 is stuffed into the tubular section 41 of the pipe combination set 40 and is positioned in such a manner that the 3 tubular discharge protrusions 62 of the seal sleeve 60 come into alignment with the outlet tubes 44 of the pipe combination set 40 respectively. Then the sealing washer 71 and the limiting block 72 are attached to the rotatable shaft 53 of the diverter valve 50 sequentially. Next, the diverter valve 50 is led into the tubular section 41 of the pipe combination set 40 with its end engaged with the interior of the seal sleeve 60 at the respective tubular discharge protrusions 62. The outer wall of the diverter valve 50 abuts against the 2 circular sealing ribs 63 of the respective tubular discharge protrusions 62.

The limiting block 72 having two symmetric retaining blocks 720 which are engaged with the positioning recesses 412 of the tubular section 41 of the pipe combination set 40. Afterwards, the locking nut 73 is engaged with the outer threads 411 of the tubular section 41 for locking the limiting block 72 and the diverter valve 50 in place. The knob 74 is then mounted onto the shaft 53 of the valve 50 and is secured to the shaft 53 by the screw 75 led through a hole 742 of the knob 74 and further engaged with an innerly threaded hole 530 of the shaft 53 of the diverter shaft 50. At the same time, the rounded end 7231 of the retaining pin 723 biased by the spring is in registration with one of the positioning holes 741 of the inner cavity 740 of the knob 74. At last, the face lid 76 is secured to the front end of the knob 74 to complete the assembly.

Figure 4A:
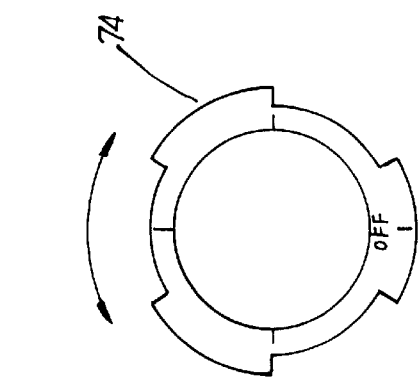
FIGS. 4A, 4B are diagrams showing the operation on the knob and the corresponding position in the diverter valve.
Figure 4B:
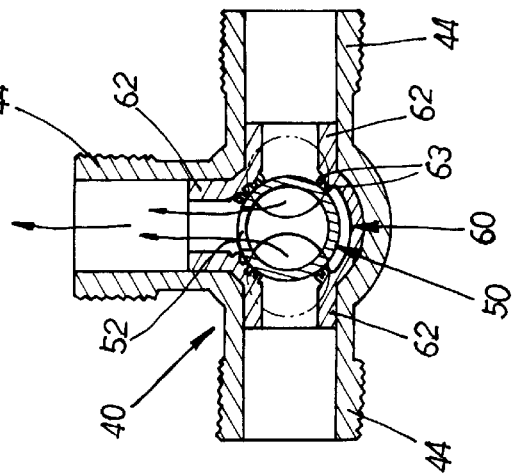
Figure 3A:
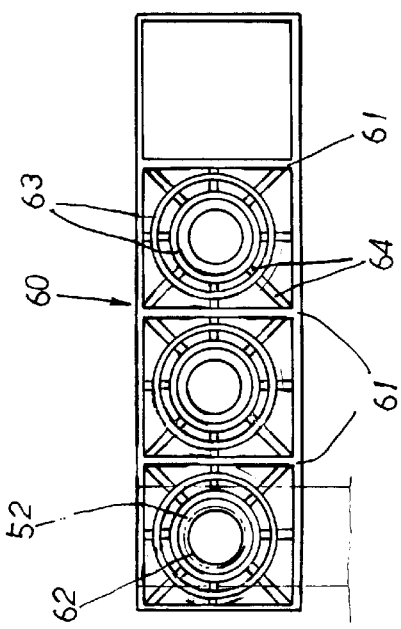
FIGS. 3A, 3B are diagrams showing the operation modes of the present invention.
Figure 3B:
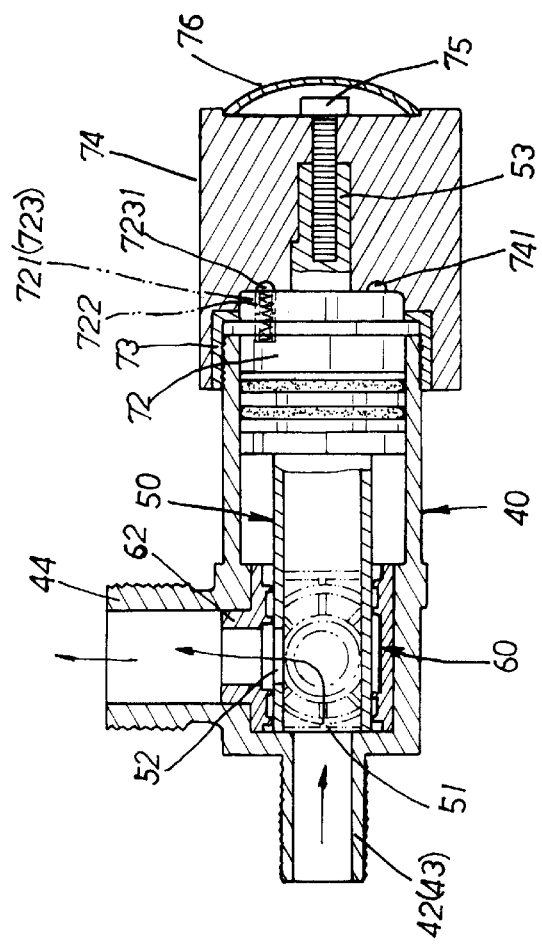
Figures 5, 5A:
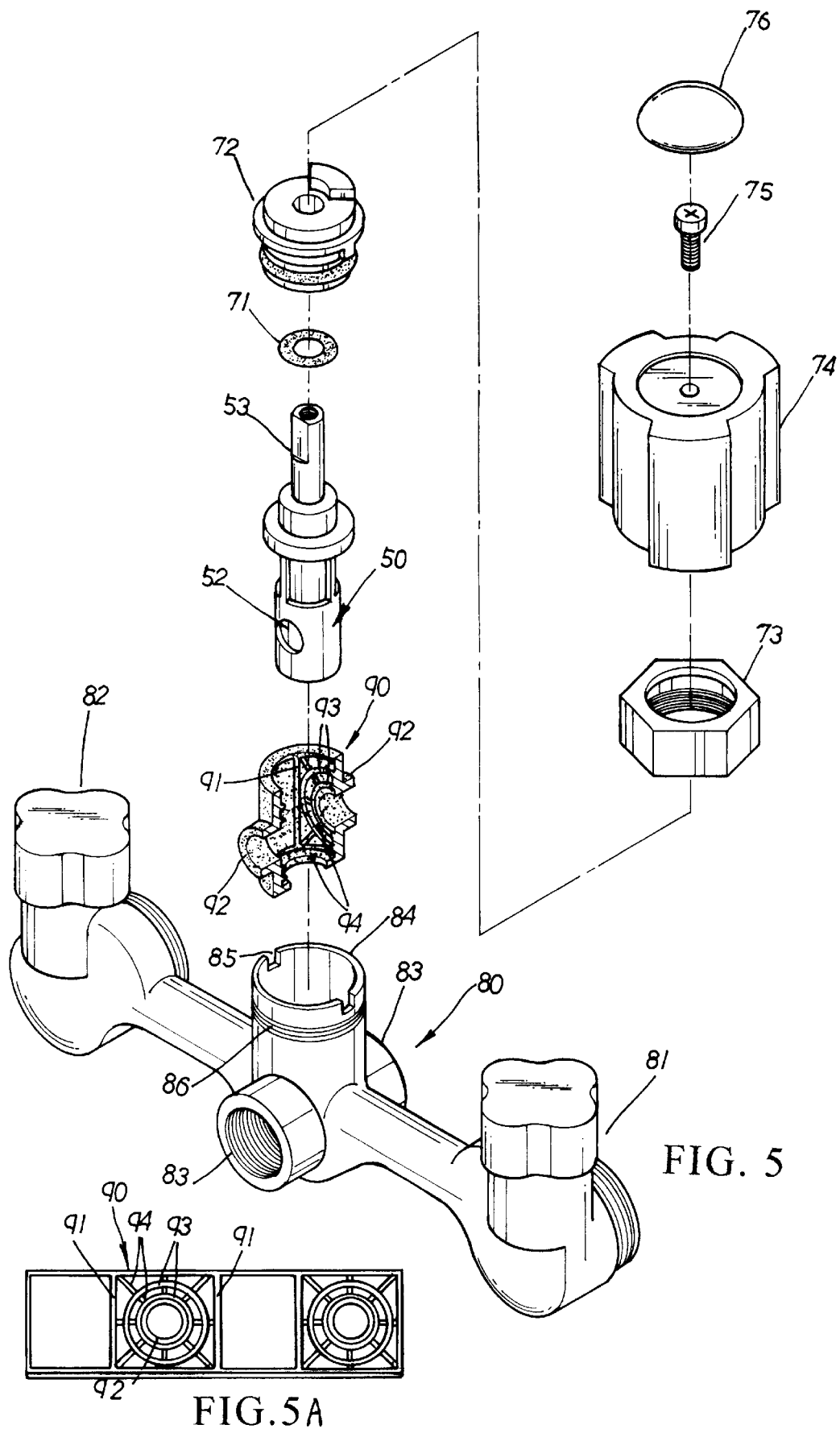
FIGS. 5, 5A, are diagrams showing the exploded components and the operation mode of the second embodiment and the present invention.

Referring to FIGS. 3A, 3B, 4A, 4B, when the faucet is to be shift from a closed state into a running state, or switched from one operation mode to another operation mode, the knob 74 is rotated clockwisely or counter clockwisely, as shown in FIG. 4A according to the marks on the knob 74 whereby the diverter valve 50 is driven to rotate or spin, making the rounded end 7231 of the retaining pin 723 housed in the receiving hole 721 of the limiting block 72 come out of engagement with its original positioning hole 741 and into registration with a newly selected positioning hole 741 of the knob 74 as a result of the bias spring 722. So, the water outlet 52 of the diverter valve 50 is made to align with one of the tubular discharge protrusions 62. Hot and cold water flowing into the closed end of the pipe combination set 40 and further into the opened end of the seal sleeve 60 and further into the opening 51 of the diverter valve 50 so that the mixed water can be selectively discharged from 1 of the 3 tubular discharge protrusions 62 when the water outlet 52 of the diverter valve 50 comes into alignment with a selected tubular discharge protrusion 62. The axial ribs 61 and the concentric circular ribs 63 and the radially extended secondary ribs 64 can effectively prevent the diverter valve 50 from leakage in operation due to the inner deformation of the seal sleeve 60. Water then can be discharged from 1 of the 3 outlet tubes 44 communicating with the tubular section 41 of the pipe combination set 40.

As further shown in FIG. 51 the second embodiment of the present invention is comprised of a diverter valve 50, a washer 71, a limiting block 72 a locking nut 73, a knob 74, a screw 75 and a face lid 76, a faucet body 80 and a seal sleeve 90. The faucet body 80 is provided with a cold and hot water inlet 81 and 82 at each end thereof and at the middle is disposed a vertical tube 84 and two horizontally extended outlets 83. On the rim of the vertical tube 84 is disposed a pair of symmetric recesses 85 and outer threads 86 are defined just under the recesses 85. The inner wall of the seal sleeve 90 is divided into 4 equal portions by axial sealing ribs 91. There are two horizontally extended tubular protrusions 92 about each of which are provided two concentrical circular ribs 93. Radially extended secondary ribs 94 are disposed between the tw circular ribs 93 and between the axial ribs 91 and the outer circular rib 93 so as to produce good sealing effect. The assembly of the faucet is carried out in the same manner as preceedingly described, and the faucet can operate in the same way as the former one.

It can be clearly seen that the multiple outlet tubes 44 extended from the tubular portion 41 of the pipe combination set 40 of the present invention permits the faucet to discharge water in various manner with the help of the corresponding seal sleeve 60 having multiple tubular discharge protrusions 62. The ribs and secondary ribs about the tubular discharge protrusions can make the sealing of the diverter valve in a more effective way. Moreover, the use of the spring biased retaining pin in the knob makes the operation of the knob in a ready and speedy manner.

I claim:

1. A diverter valve assembly for a mixing faucet, comprising a pipe combination set, a diverter valve, a seal sleeve, a seal washer, a limiting block, a locking nut, a knob, a screw and a face lid wherein said pipe combination set has a tubular portion terminating in a closed end communicating with a cold water tube and a hot water tube and at least 3 orthogonally disposed outlet tubes are communicatingly connected to said closed end of said pipe combination set; at the other end of said pipe combination set is provided with outer threads and a pair of symmetric positioning recesses;

said diverter valve has an opening at the rear end and a water outlet is defined adjacent said opening on a tubular wall thereof; at the opposite end of the diverter valve is provided with a rotation shaft so as to permit said valve to be rotatable in operation;

said seal sleeve is of a tubular form divided internally into at least 4 equal portions by axial ribs; in each of the 3 one of said 4 portions is defined an extended tubular discharge protrusion; about each of said tubular discharge protrusions, there are 2 concentric circular ribs disposed so as to effect a multiple sealing purpose; inbetween said 2 concentric circular ribs and further between the outer one of the 2 concentric circular ribs and said axial ribs are disposed radially extended secondary ribs;

said limiting block having two symmetric retaining blocks is mounted to the shaft of said diverter valve with said seal washer and is engaged with said tubular portion of said pipe combination set by engaging said retaining blocks with said positioning recesses of said tubular portion of said pipe combination set;

said locking nut disposed adjacent said limiting block is secured to the end of said tubular portion of said pipe combination set by way of the outer threads thereof;

said knob is fixed to said shaft of said diverter valve by said screw led through a screw hole on said knob with said locking nut and said limiting block received in an receiving cavity of said knob, and said face lid is engaged with said knob;

whereby said seal sleeve is inserted into and located in said tubular portion of said pipe combination set in such a manner that said tubular discharge protrusions come into registration with said outlet tube,s of said tubular portion of said pipe combination set respectively; said diverter valve is inserted into said tubular seal sleeve and in communication with said hot and cold water tube at the closed end of said pipe, in sealing engagement with said concentric circular ribs and said axial ribs and said radially extended secondary ribs of said seal sleeve, with said water outlet thereof in rotatable registration with one of said tubular discharge protrusions of said seal sleeve alternatively so as to permit water to be selectively discharged from said outlet tubes of said pipe combination set, permitting multiple water discharge means to be associated with said pipe combination set in use.

2. The diverter valve assembly for a mixing faucet as claimed in claim 1 wherein said seal sleeve designed for use in a mixing faucet connected to a shower head and a faucet; said seal sleeve is divided into 4 equal portions by axial ribs and has two symmetric tubular discharge protrusions in said 2 equal portions; about each of said protrusions are disposed 2 concentrically circular ribs and between said concentric circular ribs and between the outer one of said two circular ribs and said axial ribs are disposed radially extended secondary ribs lower in height than said circular ribs for reinforcement purpose.

3. The diverter valve assembly for a mixing faucet as claimed in claim 1 wherein said limiting block having a receiving hole for housing a bias spring and a retaining pin having a rounded end is secured in position to the shaft of said diverter valve and said tubular portion of said pipe combination set by a locking nut; and said knob has a round inner cavity for housing said locking nut and said limiting block and on the bottom of said cavity are provided with at least 4 positioning holes so that said spring biased retaining pin located in said receiving hole can come into selective registration with one of said positioning holes on said knob when said knob as well as said diverter valve is rotated in operation, making the rotation of said knob in a quick and precise manner.

* * * * *